United States Patent
Hsu et al.

(10) Patent No.: US 9,787,952 B2
(45) Date of Patent: Oct. 10, 2017

(54) COLOR FILTER ARRAY AND MANUFACTURING METHOD THEREOF

(71) Applicant: NOVATEK Microelectronics Corp., Hsin-Chu (TW)

(72) Inventors: Wei Hsu, Taoyuan (TW); Shen-Fu Tsai, Taoyuan (TW); I-Hsiu Chen, Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 47 days.

(21) Appl. No.: 14/738,929

(22) Filed: Jun. 14, 2015

(65) Prior Publication Data

US 2016/0119559 A1 Apr. 28, 2016

(30) Foreign Application Priority Data

Oct. 27, 2014 (TW) .............................. 103137081 A

(51) Int. Cl.
*H04N 5/355* (2011.01)
*H04N 9/04* (2006.01)
*H04N 5/369* (2011.01)
*H04N 5/225* (2006.01)

(52) U.S. Cl.
CPC ......... *H04N 9/045* (2013.01); *H04N 5/35563* (2013.01); *H04N 5/3696* (2013.01); *H04N 5/2258* (2013.01)

(58) Field of Classification Search
CPC .... H04N 9/045; H04N 5/35563; H04N 5/335; H04N 5/3696; H04N 5/2258; H04N 13/0257

See application file for complete search history.

(56) References Cited

U.S. PATENT DOCUMENTS

| 8,139,130 | B2 | 3/2012 | Compton |
| 8,885,059 | B1* | 11/2014 | Venkataraman .. H01L 27/14618 348/218.1 |
| 2009/0086065 | A1 | 4/2009 | Kim |
| 2009/0109172 | A1* | 4/2009 | Lee ........................ G09G 3/344 345/107 |
| 2009/0200451 | A1 | 8/2009 | Conners |
| 2010/0282945 | A1* | 11/2010 | Yokogawa ........ H01L 27/14621 250/208.1 |
| 2012/0105692 | A1 | 5/2012 | Ackerson |

(Continued)

FOREIGN PATENT DOCUMENTS

| CN | 101521216 A | 9/2009 |
| CN | 103515397 A | 1/2014 |

(Continued)

*Primary Examiner* — Hung Lam

(74) *Attorney, Agent, or Firm* — Winston Hsu

(57) ABSTRACT

A color filter array for an image sensing device is disclosed. The color filter array includes a plurality of pixels and a control unit. The plurality of pixels is utilized for generating a plurality of pixel data of an image. The control unit is utilized for controlling the plurality of pixels. In addition, each of the plurality of pixels is divided into a plurality of sub-pixels corresponding to the same color. When outputting the plurality of pixel data, each of the plurality of pixels accumulates pixel value of at least one of the plurality of sub-pixels in each of the plurality of pixels as the pixel data outputted by each of the plurality of pixels.

14 Claims, 5 Drawing Sheets

(56) References Cited

U.S. PATENT DOCUMENTS

| | | | |
|---|---|---|---|
| 2015/0146067 A1* | 5/2015 | Roh | H04N 5/3696 348/308 |
| 2015/0189200 A1* | 7/2015 | Jin | H04N 9/045 348/46 |
| 2016/0255289 A1* | 9/2016 | Johnson | H04N 5/355 |

FOREIGN PATENT DOCUMENTS

| | | |
|---|---|---|
| CN | 103685992 A | 3/2014 |
| CN | 104010173 A | 8/2014 |
| JP | 2002135792 A | 5/2002 |
| JP | 2003199117 A | 7/2003 |
| JP | 2003318375 A | 11/2003 |
| JP | 200753731 A | 3/2007 |
| TW | I432036 | 3/2014 |

\* cited by examiner

COLOR FILTER ARRAY AND MANUFACTURING METHOD THEREOF

BACKGROUND OF THE INVENTION

1. Field of the Invention

The present invention relates to a color filter array for an image sensing device and manufacturing method thereof, and more particularly, to a color filter array capable of enlarging a dynamic range of an image sensing device and the manufacturing method thereof.

2. Description of the Prior Art

Image sensing devices are widely utilized in digital electronic products, such as scanners, digital cameras, mobile phones and personal digital assistants. The most common types of image sensing device are Complementary Metal Oxide Semiconductors (CMOS) and Charge Coupled Device (CCD). These image sensing devices are both silicon semiconductor devices utilized for sensing light and transferring the sensed light into electricity. The electricity generated by the image sensing device is transferred into measureable voltages, from which digital data can be acquired.

Please refer to FIG. 1, which is a characteristic diagram of the luminous flux received by a conventional image sensing device and the voltage generated by the conventional image sensing device. The voltage corresponds to the image information sensed by the image sensing device. As shown in FIG. 1, the image sensing device transfers the luminous flux to a measureable voltage once the luminous flux received by the image sensing device exceeds a minimum luminous flux LFmin. In other words, the image sensing device acquires valid image information when the luminous flux received by the image sensing device during an image sensing time period exceeds the minimum luminous flux LFmin. Thus, if the minimum luminous flux is made smaller, the image sensing device may acquire image information corresponding to less luminance.

The image sensing generates a maximum voltage Vmax when the luminous flux received by the image sensing device exceeds a maximum luminous flux LFmax. In other words, the image sensing device outputs maximum voltage Vmax when different image information having corresponding luminous flux exceeding the maximum luminous flux LFmax are received by the image sensing device. In such a condition, the different image information cannot be identified. Therefore, when the maximum luminous flux LFmax becomes higher, the luminous flux range of the image information which can be identified by the image sensing device becomes broader. The prior art provides a dynamic range (DR) as an indicator for evaluating the luminous flux range of the image information which is capable of being identified by the image sensing device, i.e. the range of the luminous flux which is received by the image sensing device and is capable of being identified by the image sensing device. The dynamic range is defined as:

$$DR = 20\text{Log}\left(\frac{LF\text{max}}{LF\text{min}}\right)$$

Generally, when the dynamic range of the image sensing device increases, the luminance differences in the image information which can be sensed by the image sensing device become greater. Thus, how to increase the dynamic range of the image sensing device becomes a topic to be discussed.

SUMMARY OF THE INVENTION

In order to solve the above problem, the present invention provides a color filter array capable of enlarging a dynamic range of an image sensing device and the manufacturing method thereof.

In an aspect, the present invention discloses a color filter array for an image sensing device. The color filter array comprises a plurality of pixels and a control unit. The plurality of pixels is utilized for generating a plurality of pixel data of an image. The control unit is utilized for controlling the plurality of pixels. In addition, each of the plurality of pixels is divided into a plurality of sub-pixels corresponding to the same color. When outputting the plurality of pixel data, each of the plurality of pixels accumulates pixel value of at least one of the plurality of sub-pixels in each of the plurality of pixels as the pixel data outputted by each of the plurality of pixels. The dynamic range of the color filter array is therefore enlarged.

As to another aspect, the present invention discloses a method of manufacturing a color filter array, which is used for generating a plurality of pixel data of an image. The method comprises arranging a repeated pattern, repeatedly, for forming a color filter array comprising a plurality of pixels; and dividing each of the plurality of pixels into a plurality of sub-pixels with the same pixel color. When outputting the plurality of pixel data, each of the plurality of pixels accumulates pixel value of at least one of the plurality of sub-pixels in each of the plurality of pixels as the pixel data outputted by each of the plurality of pixels. The dynamic range of the color filter array manufactured by the method can be effectively enlarged.

These and other objectives of the present invention will no doubt become obvious to those of ordinary skill in the art after reading the following detailed description of the preferred embodiment that is illustrated in the various figures and drawings.

DETAILED DESCRIPTION

In the following examples, each pixel of a color filter array in an image sensing device is divided into a plurality of sub-pixels. When the image sensing device captures an image, each pixel acquires pixel data of the pixel in the image via accumulating a pixel value of at least one of the plurality of sub-pixels, so as to increase a dynamic range of the image sensing device.

Figure 1:
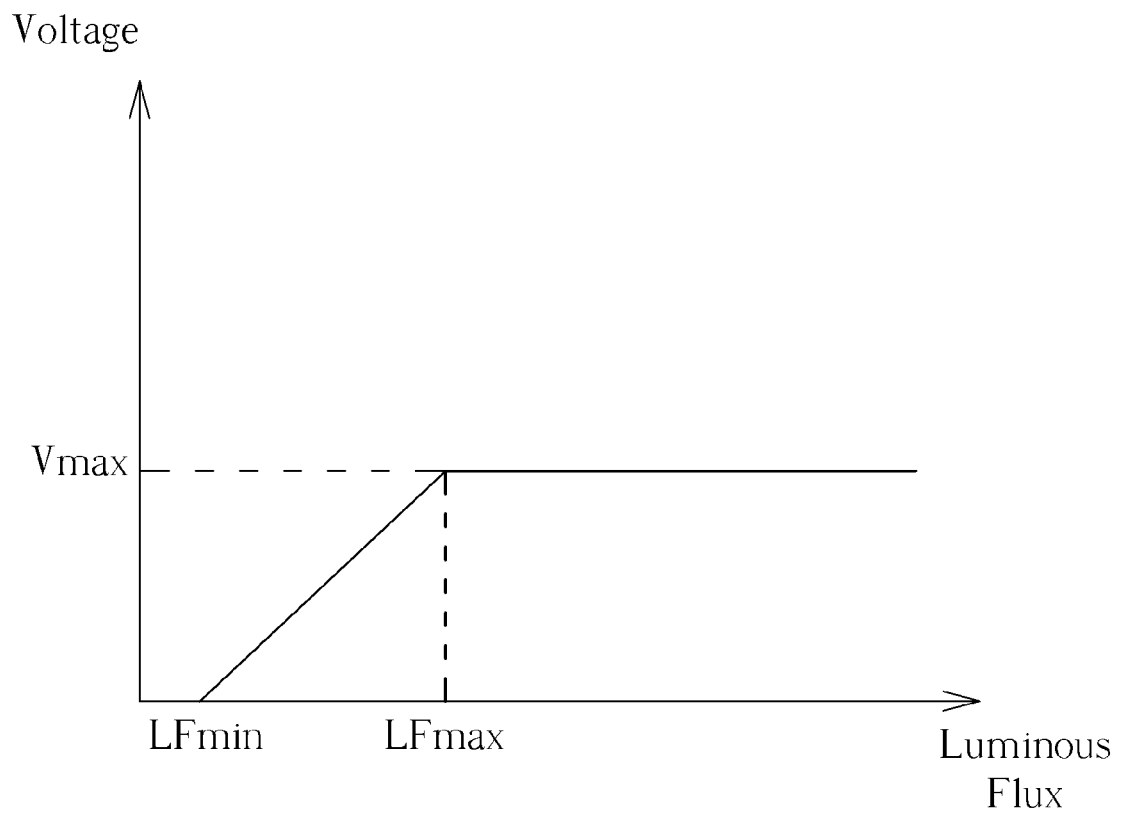
FIG. 1 is a characteristic diagram of the luminous flux received by a conventional image sensing device and the voltage generated by the conventional image sensing device.
Figure 2:
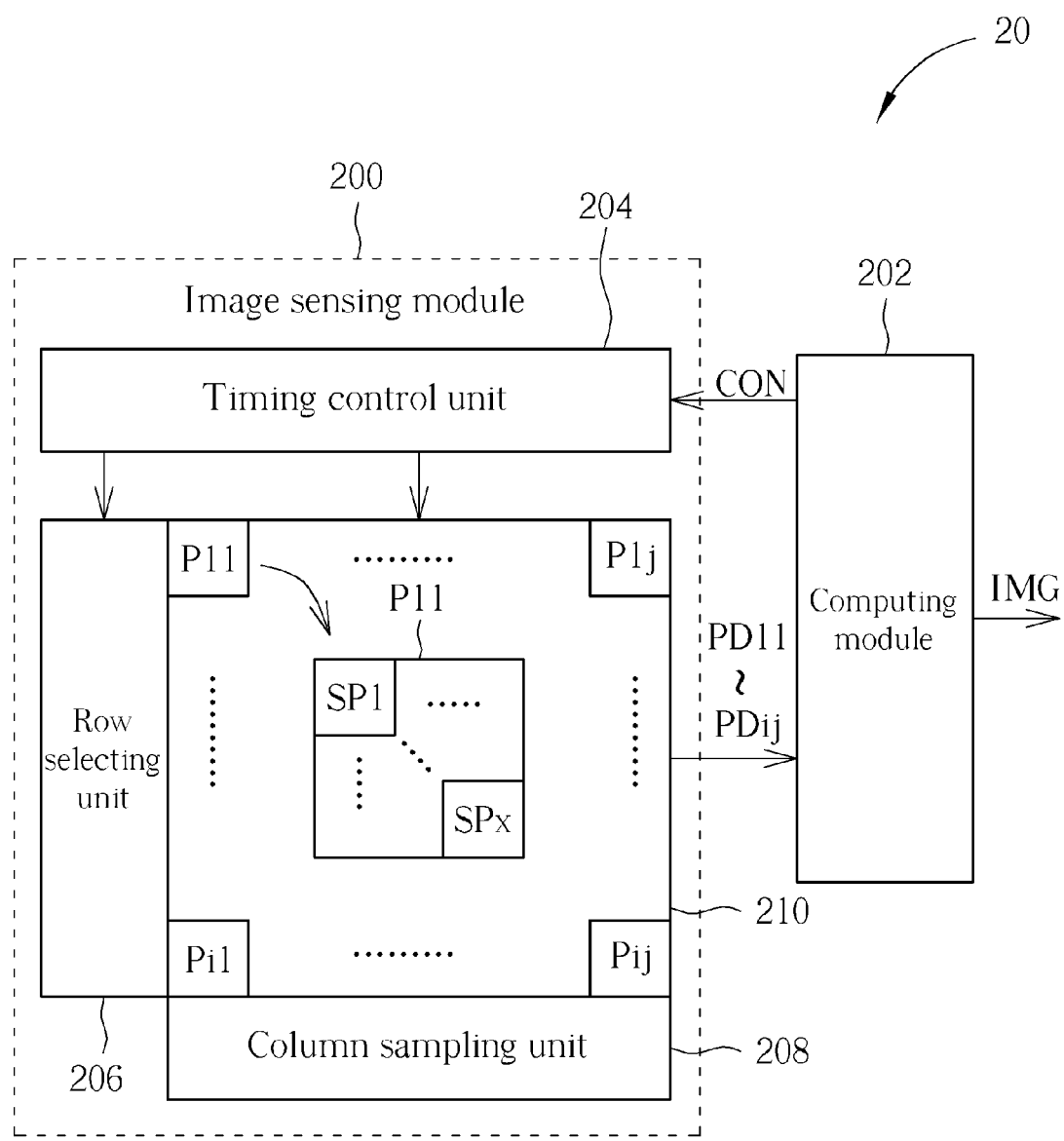
FIG. 2 is a schematic diagram of an image sensing device according to an example of the present invention.

Please refer to FIG. 2, which is a schematic diagram of an image sensing device 20 according to an example of the present invention. The image sensing device may be an electronic product with an image sensing function, such as a digital camera, a digital video camera or a smart phone. As shown in FIG. 2, the image sensing device 20 comprises an image sensing module 200 and a computing module 202. The image sensing module 200 comprises a timing control unit 204, a row selecting unit 206, a column sampling unit 208 and a color filter array 210, and is utilized for capturing pixel data PD11-PDij of an image IMG according to a control signal CON. The color pixel array 210 comprises pixels P11-Pij and the computing module 202 is utilized for generating the control signal CON to control the image sensing module 200 and for processing the pixel data PD11-PDij to generate the image IMG. Note that, each of the pixels P11-Pij is divided into a plurality of sub-pixels SP1-SPx (FIG. 2 takes the pixel P11 as an example). The color filter array 210 may adjust the outputted pixel data PD11-PDij according to pixel values sensed by each of the plurality of sub-pixels SP1-SPx in each of the pixels P11-Pij. As a result, the dynamic range of the image sensing device 20 is effectively increased.

In detail, a pixel Pnm of the pixels P11-Pij may generate the maximum voltage Vmax corresponding to a pixel value 255 (e.g. a digital value 255) when the pixel Pnm receives the maximum luminous flux LFmax and is not divided into the plurality of sub-pixels SP1-SPx. Since the number of electrons in the pixel Pnm is saturated when the pixel Pnm receives the maximum luminous flux LFmax, the pixel Pnm still generates the maximum voltage Vmax even if the luminous flux received by the pixel Pnm exceeds the maximum luminous flux LFmax. For example, the pixel Pnm would generate the maximum voltage Vmax corresponding to the pixel value 255 when the pixel Pnm receives the luminous flux $$\frac{3}{2}LF\text{max}.$$

Under such a condition, the pixel Pnm cannot present the real luminance differences between the pixels P11-Pij.

In this example, the pixel Pnm is divided into the plurality sub-pixels SP1-SPx which are corresponding to the pixel color of the pixel Pnm. When the pixel Pnm receives the luminous flux $$\frac{3}{2}LF\text{max},$$

each of the sub-pixels SP1-SPx receives the luminous flux $$\frac{3}{2x}LF\text{max}$$

and the voltages generated by each of the sub-pixels SP1-SPx is corresponding to the pixel value $$\frac{3}{2x}\times 255.$$

Since the number of the sub-pixels SP1-SPx is greater than or equal to 2, the pixel value $$\frac{3}{2x}\times 255$$

must be smaller than the pixel value 255. In such a condition, the pixel Pnm may accumulate the pixel value $$\frac{3}{2x}\times 255$$

of at least one of the sub-pixel SP1-SPx as the outputted pixel data PDnm. For example, the pixel Pnm may acquire the pixel value $$\frac{3}{2x}\times 255$$

of one of the sub-pixels SP1-SPx as the pixel data PDnm. Or, the designer may define a saturated threshold TH and limit the pixel data PDnm outputted by the pixel Pnm to be smaller than or equal to the saturated threshold TH. In an example, the saturated threshold may be the pixel value 255. As long as the pixel data PDnm does not exceed the pixel value 255, the pixel Pnm may accumulate the pixel values of random number of the sub-pixels SP1-SPx as the pixel data PDnm. As a result, the dynamic range of the image sensing device 20 can be increased.

Figure 3:
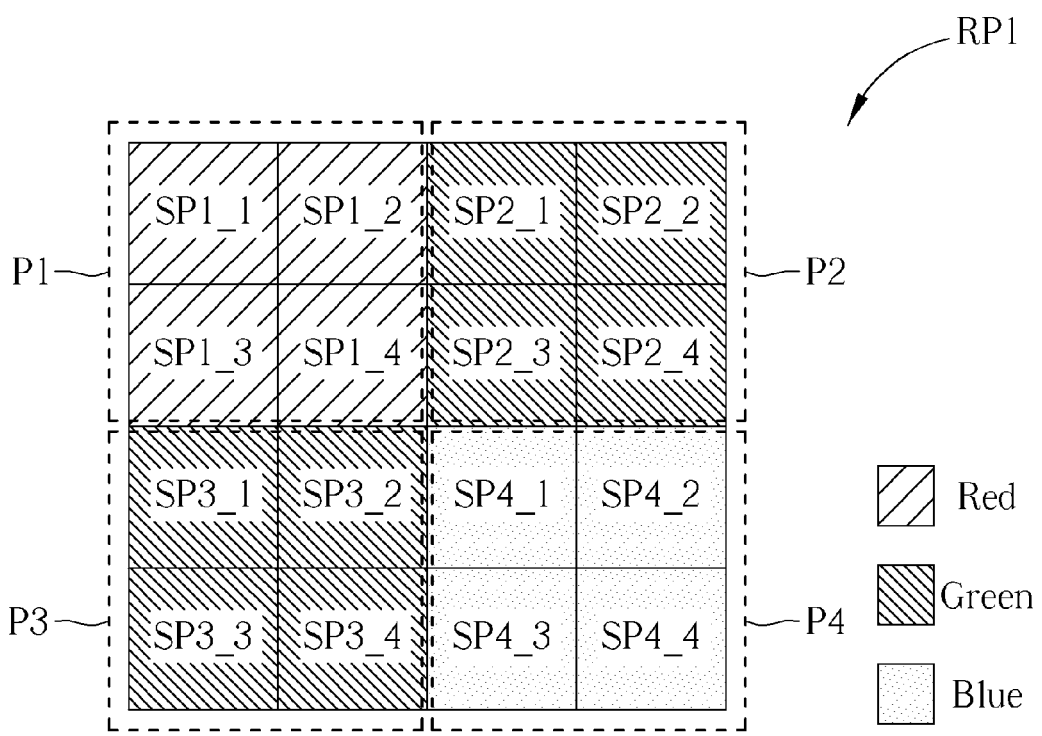
FIG. 3 is a schematic diagram of a repeated pattern in the color filter array of the image sensing device shown in FIG. 2.

Please refer to FIG. 3, which is a repeated pattern RP1 of the color filter array 210 shown in FIG. 2. The color filter array 210 can be realized by repeatedly arranging the repeated pattern RP1. Note that, FIG. 3 is utilized for illustrating the relative positions among the pixels and is not utilized for limiting the actual length-width ratio of each pixel. As shown in FIG. 3, the repeated pattern RP1 comprises pixels P1-P4, wherein the pixels P1-P4 may be the adjacent pixels among the pixels P11-Pij shown in FIG. 2. The pixel P2 is adjacent to the right side of the pixel P1, the pixel P3 is adjacent to the bottom side of the pixel P1 and the pixel P4 is adjacent to the pixels P2 and P3. The pixels P1-P4 are corresponding to red, green, green and blue, respectively.

Further, the pixels P1-P4 of the repeated pattern RP1 are respectively divided into sub-pixels SP1_1-SP1_4, SP2_1-SP2_4, SP3_1-SP3_4 and SP4_1-SP4_4, wherein the sub-pixels SP1_1-SP1_4 are corresponding to red of the pixel P1, the sub-pixels SP2_1-SP2_4 are corresponding to green of the pixel P2, and so on. In such a condition, the pixels P1-P4 may adjust the outputted pixel data according to the pixel values sensed by the sub-pixels SP1_1-SP1_4, SP2_1-SP2_4, SP3_1-SP3_4 and SP4_1-SP4_4.

In an example, the pixel P1 is not divided into the plurality of sub-pixels SP1_1-SP1_4 and may generate the maximum voltage Vmax corresponding to the pixel value 255 when the pixel P1 receives the maximum luminous flux LFmax. The pixel P1 still generates the maximum voltage Vmax even if the luminous flux received by the pixel P1 exceeds the maximum luminous flux LFmax. For example, the pixel P1 would generate the maximum voltage Vmax corresponding to the pixel value 255 when the pixel Pnm receives the luminous flux $$\frac{4}{3}LF\text{max}.$$

Under such a condition, the pixel P1 cannot present the actual luminance differences among the pixels P1-P4.

In comparison, the pixel P1 is divided into the sub-pixels SP1_1-SP1_4 in this example. Each of the sub-pixels SP1_1-SP1_4 receives the luminous flux when the pixel P1 receives the luminous flux $$\frac{1}{3}LF\text{max}.$$

In such a condition, each of the sub-pixels SP1_1-SP1_4 generates a voltage $$\frac{1}{3}V\text{max}$$

corresponding to the pixel value 85. The pixel P1 may accumulate the pixel values of 1-3 of the sub-pixels SP1_1-SP1_4 as the outputted pixel data. For example, the pixel P1 may acquire the pixel value 85 of one of the sub-pixels SP1_1-SP1_4 as the outputted pixel data. Or, the pixel P1 may accumulate the pixel values of 2 of the sub-pixels SP1_1-SP1_4 and acquire the pixel value 170 as the outputted pixel data. Further, the pixel P1 may accumulate the pixel values of 3 of the sub-pixels SP1_1-SP1_4 and acquire the pixel value 255 as the outputted pixel data. That is, the saturated threshold TH is defined as the pixel value 255 corresponding to the maximum voltage Vmax in this example. According to the above descriptions, the color filter array 210 realized by repeatedly arranging the repeated pattern RP1 effectively improves the dynamic range of the image sensing device 20.

Figure 4:
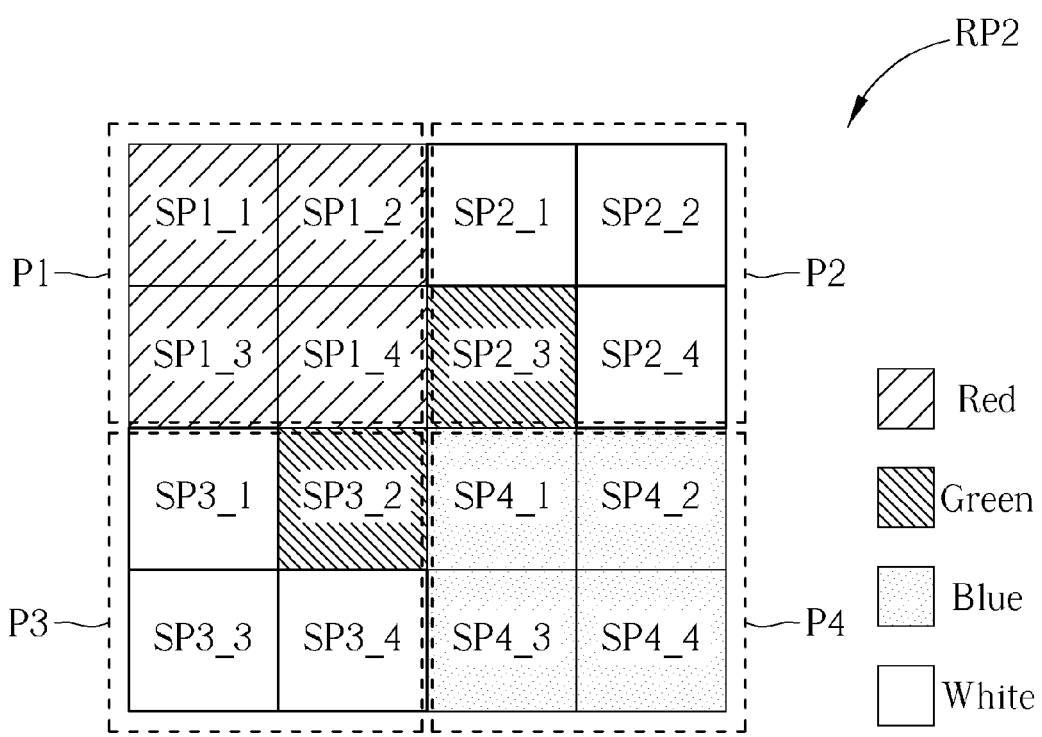
FIG. 4 is a schematic diagram of another repeated pattern in the color filter array of the image sensing device shown in FIG. 2.

In the above example, the sensitivity of the color filter array 210 may be decreased by dividing each pixel of the color filter array 210 into the plurality of sub-pixels SP1-SPx. In an example, the sensitivity of the color filter array can be improved via altering parts of the sub-pixels SP1-SPx of each pixel to be corresponding to another pixel color (e.g. white). Please refer to FIG. 4, which is schematic diagram of a repeated pattern RP2 in the color filter array 210 shown in FIG. 2. The repeated pattern RP2 shown in FIG. 4 is similar to the repeated pattern RP1 shown in FIG. 3, thus the components with similar functions use the same symbols. Different from the repeated pattern RP1 shown in FIG. 3, the sub-pixels SP2_1, SP2_2, SP2_4, SP3_1, SP3_3, SP3_4 are changed to be corresponding to white. Under such a condition, the sub-pixels SP2_1, SP2_2, SP2_4, SP3_1, SP3_3, SP3_4 can receive more luminous flux and the sensitivity of the color filter array 210 is therefore increased.

The above examples divide each pixel of the color filter array in the image sensing device into the plurality of sub-pixels and accumulate the pixel value of at least one of the plurality of sub-pixels in each pixel as the pixel data, to increase the dynamic range of the image sensing device. According to different applications and design concepts, those with ordinary skill in the art may observe appropriate alternations and modifications. For example, the ratio between a number of white sub-pixels and that of green sub-pixels in the pixels P2 and P3 shown in FIG. 4 may be changed to 1, and is not limited herein. In another example, the sub-pixels corresponding to red and blue may alter to be corresponding to white, so as to improve the sensitivity of the color filter array 210. Moreover, parts of the sub-pixels in the color filter array 210 may change to other appropriate colors (e.g. yellow), which are different from red, blue, green and white, and the sensitivity of the color filter array 210 can be also improved.

Figure 5A:
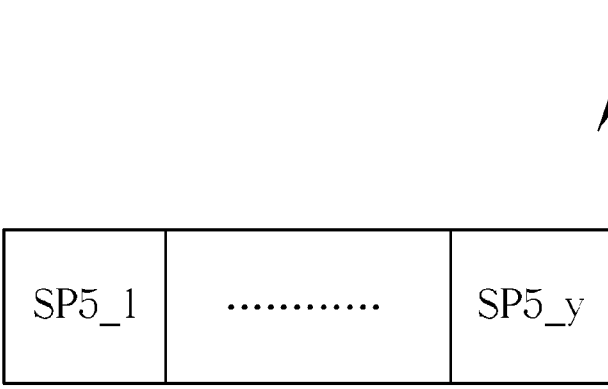
FIGS. 5A and 5B are schematic diagrams of pixels in the color filter array of the image sensing device shown in FIG. 2.
Figure 5B:
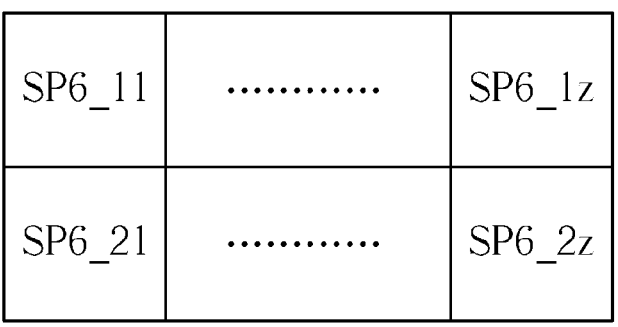

In addition, the method of dividing the pixel into the plurality of sub-pixels is not limited to those shown in FIGS. 3 and 4. Please refer to FIG. 5A and 5B, which are schematic diagrams of pixels in the color filter array 210 shown in FIG. 2. In FIG. 5A, a pixel P5 is divided into sub-pixels SP5_1-SP5_y which are arranged as a strip. As shown in FIG. 5B, a pixel P6 is divided into sub-pixels SP6_11-SP6_2z which are arranged as a rectangle. According to different design concepts, the method of dividing the pixel into the plurality of sub-pixels can be appropriately altered and modified.

Figure 6:
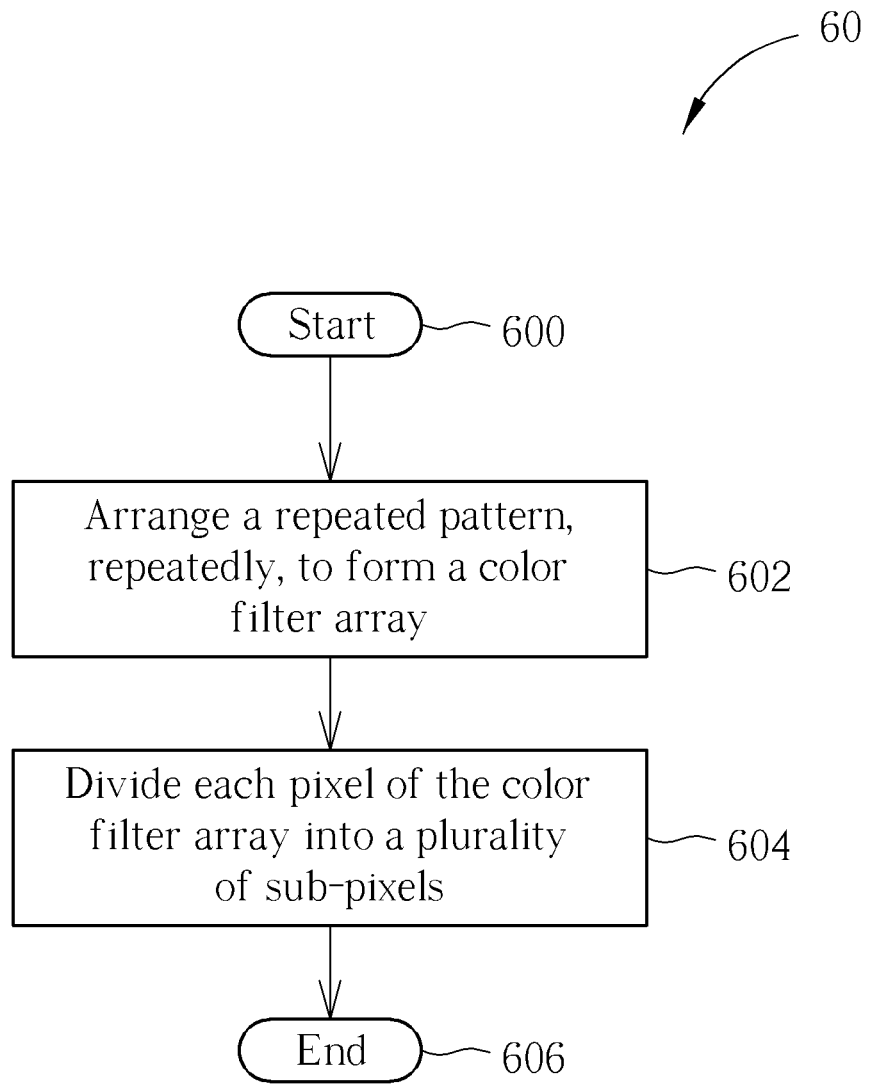
FIG. 6 is a flowchart of a process according to an example of the present invention.

The method of realizing the color filter array 210 shown in FIG. 2 can be summarized into a process 60 as shown in FIG. 6. The process 60 may be utilized for manufacturing a color filter array used in the image sensing device. The color filter array manufactured through the process 60 inherently has a great dynamic range. The process 60 comprises the following steps:

Step 600: Start.

Step 602: Arrange a repeated pattern, repeatedly, to form a color filter array.

Step 604: Divide each pixel of the color filter array into a plurality of sub-pixels.

Step 606: End.

According to the process 60, each pixel of the color filter array is divided into a plurality of sub-pixels. In such a condition, each pixel can adjust outputted pixel data according to pixel values sensed by the sub-pixels when the color filter array generates the pixel data of an image, to increase the dynamic range of the image sensing device. The detailed operations of the process 60 can be referred to the above and are not narrated herein for brevity.

To sum up, the above examples divide each pixel of the color filter array in the image sensing device into a plurality of sub-pixels and accumulate the pixel value of at least one of the plurality of sub-pixels in each pixel as the pixel data. The dynamic range of the image sensing device is effectively increased, therefore.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A color filter array for an image sensing device, the color filter array comprising:
   a plurality of pixels, for generating a plurality of pixel data of an image; and
   a control unit, for controlling the plurality of pixels;
   wherein each of the plurality of pixels is divided into a plurality of sub-pixels corresponding to the same color;
   wherein each of the plurality of pixels accumulates pixel value of at least one of the plurality of sub-pixels in each of the plurality of pixels as the pixel data outputted by each of the plurality of pixels;

wherein the plurality of sub-pixels in a first pixel of the plurality of pixel is corresponding to a first pixel color, and at least one of the plurality of sub-pixels in the first pixel is altered to be corresponding to a second pixel color;

wherein the first color is different from the second pixel color.

2. The color filter array of claim 1, wherein the pixel data outputted by each of the plurality of pixels is smaller than a saturated threshold.

3. The color filter array of claim 1, wherein the second pixel color is white.

4. The color filter array of claim 1, wherein the plurality of sub-pixels in each pixel is arranged as a strip.

5. The color filter array of claim 1, wherein the plurality of sub-pixels in each pixel is arranged as a rectangle.

6. The color filter array of claim 1 further comprising:

a plurality of repeated pattern, wherein each of the plurality of repeated pattern comprises a first pixel, a second pixel, a third pixel and a fourth pixel of the plurality of pixels;

wherein the second pixel is adjacent to a first side of the first pixel, the third pixel is adjacent to a second side of the first pixel and the fourth side is adjacent to the second pixel and the third pixel;

wherein the first pixel, the second pixel, the third pixel and the fourth pixel are respectively corresponding to a first pixel color, a second pixel color, the second pixel color and a third pixel color.

7. The color filter array of claim 6, wherein the first pixel color, the second pixel color and the third pixel color are red, green and blue, respectively.

8. A method of manufacturing a color filter array, which is used for generating a plurality of pixel data of an image, the method comprising:

arranging a repeated pattern, repeatedly, for forming a color filter array comprising a plurality of pixels;

dividing each of the plurality of pixels into a plurality of sub-pixels with the same pixel color; and altering at least one of the sub-pixels corresponding to a first pixel color in a first pixel of the plurality of pixel to a second pixel color;

wherein each of the plurality of pixels accumulates pixel value of at least one of the plurality of sub-pixels in each of the plurality of pixels as the pixel data outputted by each of the plurality of pixels;

wherein the first pixel color is different from the second pixel color.

9. The method of claim 8, wherein the pixel data outputted by each pixel is smaller than a saturated threshold.

10. The method of claim 8, wherein the second color is white.

11. The method of claim 8, wherein the plurality of sub-pixels of each of the plurality of pixels is arranged as a strip.

12. The method of claim 8, wherein the plurality of sub-pixels of each of the plurality of pixels is arranged as a rectangle.

13. The method of claim 8, wherein each of the plurality of repeated pattern comprises a first pixel, a second pixel, a third pixel and a fourth pixel of the plurality of pixels; wherein the second pixel is adjacent to a first side of the first pixel, the third pixel is adjacent to a second side of the first pixel and the fourth side is adjacent to the second pixel and the third pixel; wherein the first pixel, the second pixel, the third pixel and the fourth pixel are respectively corresponding to a first pixel color, a second pixel color, the second pixel color and a third pixel color.

14. The method of claim 13, wherein the first pixel color, the second pixel color and the third pixel color are red, green and blue, respectively.

* * * * *